United States Patent [19]

Heijwegen et al.

[11] Patent Number: 4,854,946
[45] Date of Patent: Aug. 8, 1989

[54] METHOD FOR TREATING BLAST FURNACE GAS AND APPARATUS FOR CARRYING OUT THAT METHOD

[75] Inventors: Cornelis P. Heijwegen, Castricum; Willem Kat, Heiloo, both of Netherlands

[73] Assignee: Hoogovens Groep B.V., Ijmuiden, Netherlands

[21] Appl. No.: 664,092

[22] Filed: Oct. 24, 1984

Related U.S. Application Data

[63] Continuation-in-part of Ser. No. 489,574, Apr. 28, 1983, abandoned.

[30] Foreign Application Priority Data

May 4, 1982 [NL] Netherlands ............... 8201841

[51] Int. Cl.$^4$ ............................................. B01D 53/14
[52] U.S. Cl. .................................. 55/85; 55/89; 55/228; 75/25; 75/41
[58] Field of Search ............ 55/85, 89, 226, 228, 55/421; 210/787, 790; 75/25, 41

[56] References Cited

U.S. PATENT DOCUMENTS

| | | | |
|---|---|---|---|
| 3,396,514 | 8/1968 | Hurst et al. ................. | 55/85 |
| 3,788,469 | 1/1974 | Hirsch et al. ............... | 55/85 |
| 3,976,454 | 8/1976 | Hausberg et al. .......... | 261/116 |
| 4,134,755 | 1/1979 | Maeda ........................ | 75/25 |
| 4,152,123 | 1/1979 | Hegemann et al. ........ | 55/85 |
| 4,250,027 | 2/1981 | Cases et al. ............... | 75/25 X |
| 4,425,228 | 1/1984 | Lynn et al. ................. | 75/25 X |

FOREIGN PATENT DOCUMENTS 0003464 8/1979 European Pat. Off. .

Primary Examiner—Charles Hart
Attorney, Agent, or Firm—Stevens, Davis, Miller & Mosher

[57] ABSTRACT

Blast furnace gas containing dust particles has the coarsest particles removed and the result wet scrubbed before being fed to a treatment apparatus for separating the remaining coarse dust, which has a low lead and zinc concentration. The gas dust is fed to a separator in the form of a thickener where coarse particles are removed through an outlet whilst the remaining gas dust is fed to a settling basin. This concentrates the dust particles before they are fed via pipe to a second separator having two hydrocyclones. Here the coarse particles are removed via pipe. The coarse particles from the outlet and pipe are suitable for feeding to a blast furnace as they are low in lead and zinc. The presence of the settling basin gives a more distinct separation if the dust particles by the hydrocyclones and the hydrocyclones can operate more efficiently.

13 Claims, 1 Drawing Sheet

METHOD FOR TREATING BLAST FURNACE GAS AND APPARATUS FOR CARRYING OUT THAT METHOD

This application is a continuation of application Ser. No. 489,574, filed Apr. 28, 1983 and now abandoned.

BACKGROUND OF THE INVENTION

1. Field of the Invention

The present invention relates to a method of treating blast furnace gas and to an apparatus for carrying out that method.

It is known to treat blast furnace gas in order to separate a coarse fraction of the gas which has a low lead and zinc concentration. After filtration such a component may be used as a raw material for feeding to a blast furnace. In known methods the coarsest dust particles in the gas are removed by a dry removal process then the gas is wet scrubbed and the grains of the resulting blast furnace gas dust are separated to obtain the desired coarse fraction. Such a method of treating blast furnace gas is described in French patent specification Nos. 2,299,089 and 2,362,669 and in published European patent application No. 0,003,464, in which a hydrocyclone is used. A hydrocyclone is a known device and its use for separating dusts according to grain size is described in e.g. U.S. Pat. No. 2,760,635. The structure of a hydrocyclone and its use in separating blast furnace gas into fractions with respectively higher and lower lead and zinc concentrations will therefore be clear to the skilled man and will not be described in detail in this specification.

The advantage of such known methods for separating blast furnace gas is that efficient separation can be achieved at low cost. However, a problem may arise in the known methods when the fraction of the blast furnace gas with small grain size is low and when the initial concentrations of lead and zinc is also low. These conditions may occur, for example, when the raw material for treatment is blast furnace gas resulting from a standard wet scrubbing process followed by the passing of the blast furnace gas through a dust bag filter. Wet scrubbing followed by dust bag filtering is common in modern blast furnace plants, the coarse material from the dust bag filter being returned directly to the blast furnace.

The assignees of the present application have analysed a large number of samples of blast furnace gas dust collected after wet scrubbing, produced by their own blast furnaces. The average lead and zinc concentration in the samples was found to be 0.67% and 0.22% respectively. It was found, however, that these concentrations may vary in dependence on the composition of the charge of the blast furnace and in the process carried out in the furnace.

Table 1 shows a typical blast furnace gas dust composition.

TABLE 1

| fraction | percentages by weight | percentage of zinc | percentage of lead |
|---|---|---|---|
| <5 μm | 14 | 3.61 | 1.25 |
| 5–10 | 3 | 0.64 | 0.18 |
| 10–20 | 12 | 0.28 | 0.10 |
| 20–30 | 7 | 0.20 | 0.04 |
| 30–60 | 28 | 0.18 | 0.05 |
| >60 | 36 | 0.14 | 0.04 |

This material suspended in large quantities of water (e.g. 0–4 grams of dust/liter), is conveyed to the above-mentioned grain separation plant.

If this gas dust, suspended in large quantities of water (e.g. 0 to 4 grams of dust per liter) is supplied to the known treatment apparatus the top fraction of the hydrocyclone will be too coarse, unless separation is carried out on a smaller grain size in which case the separation will be inefficient and the amount of dust separated will be small.

SUMMARY OF THE INVENTION

The present invention seeks to overcome the problems of the prior art method for treating blast furnace gas by separating the grains of blast furnace gas in a series of stages each stage separating the grains into a fine grain fraction and a coarse grain fraction, with the fine grain fraction from at least the first separation stage being concentrated before being fed to the next separation stage in the series. The separation stages are preferably hydrocyclone installations.

It has been found that the concentration of the fine grain fraction enables a more selective separation of grains into finer and coarser material in the subsequent separation stage. This renders possible the use of a smaller hydrocyclone in the second and each subsequent stage than is possible with prior art methods.

The concentration step may be carried out in a known concentrator e.g. a settling basin. Many different types of suitable concentratos are available commercially and will not be described in detail in this specification.

It is preferable that the first separation stage separates the dust grains into a fine grain fraction of grains of a size less than 120 to 150 μm and a coarse grain fraction of grains greater than this size. The fine grain fraction may then be concentrated in a settling basin to have a solid dust content of between 10% and 50%, preferably between 10% and 30%. Then the concentrated fine grain fraction is passed to the second separation stage. If a hydrocyclone installation is used for the second separation stage, it should preferably operate at an initial pressure of 0.5 to 3 kg/cm$^2$ ($5 \times 10^4$ to $3 \times 10^5$ Nm$^{-2}$). It has been found that when the fine grain fraction from the first separation stage is concentrated according to the present invention, the separation in the second separation stage may be sufficiently selective to enable the dust grains to be separated into those greater than, and those less than, between 5 μm and 25 μm.

The method of the present invention enables the coarse grain fraction from each separation stage to have a sufficiently low lead and zinc content to enable it to be used to form a raw material to be fed to a blast furnace. To produce this raw material the coarse grain fraction may be collected on a filter and dried. Both press filters and vacuum filters are suitable for the collection of the fine grain fraction. Such filters are well known and will not be described in greater detail. The collected and dried coarse grain fractions may then be sintered using a process well known in blast furnace technology.

Instead of filtering and drying the coarse grain fraction, other agglomeration methods may be used. For example, the fine grain fraction may be bound with adhesives, and then converted into ore pellets. This and other methods for rendering ore dust suitable for feeding a blast furnace are well known.

The present invention also provides an apparatus for carrying out the method described comprising at least two separators in series and a concentrator between at least the first and second separator. A further concentrator may be provided after the last separator in the series. This apparatus may be constructed as part of a separation plant for treating blast furnace gas dust.

BRIEF DESCRIPTION OF THE DRAWINGS

An embodiment of the invention will now be described, by way of example, with reference to the accompanying drawing in which.

Figure 1:
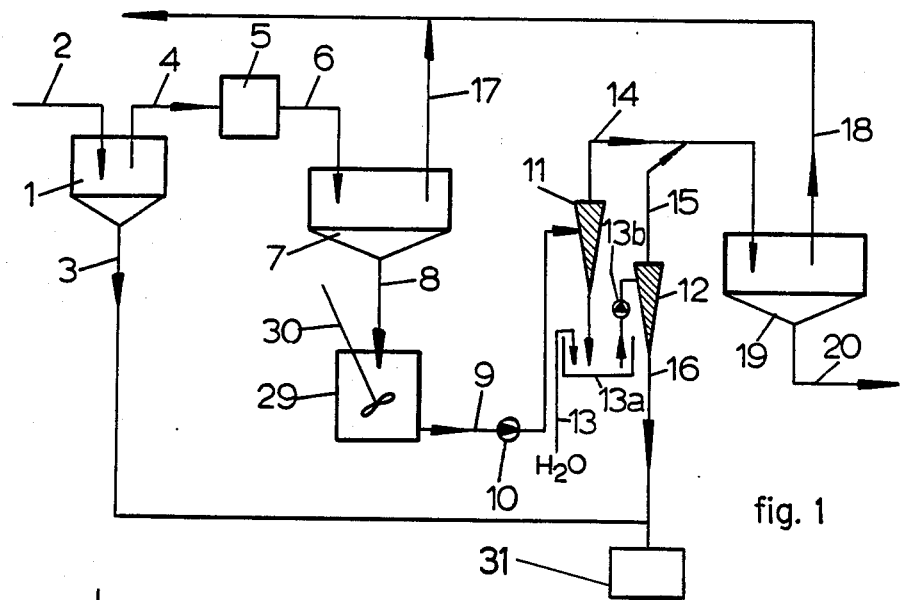
FIG. 1 is a schematic view of a separation plant according to the present invention.

A dust/water mixture deriving from a wet scrubbing process is fed, through pipe 2 to a thickener 1 forming a first concentration stage. This thickener 1 is operated under overload conditions, as a result of which coarse particles with a grain size exceeding 150 μm are separated through a bottom outlet 3 of the thickener 1. A hydrocyclone of the type known from the patent specifications mentioned above may also be used for this first separation stage, instead of the thickener 1.

The remaining water/dust mixture is then fed through a CO, expeller 5 and a pipe 6 to a settling basin 7 forming a concentration stage. The size of the settling basin 7 is chosen so that all the solid dust particles from the mixture settles in it. Overflow from the settling basin 7 is clean water which is returned through pipe 17 to wet scrubbers of the blast furnaces.

The sludge precipitated on the settling basin 7 is discharged from the settling basin 7 through a pipe 8, at a dust concentration of 10-15% by weight. This sludge is fed through pipe 9 and pump 10 to a hydrocyclone installation, by way of an intermediate sludge tank 29 having an agitator 30. During this process a dust concentration of 10-30% by weight should preferably be maintained.

The hydrocyclone installation illustrated in FIG. 1 has two stages 11 and 12. Each stage may consist of a number of hydrocylcones connected in parallel, because one hydrocyclone only has a limited capacity. To achieve optimum separation hydrocyclones should be used with a d50 value of 8-12 μm, and a d95 value of 25-50 μm. Both these values are important because they provide the most distinct separation possible. The necessary initial pressure is set to between 1 and 2 bars.

The two stages 11 and 12 are connected in series so that the top fractions are agglomerated whilst the bottom fractions from the hydrocyclones in stage 11, whether or not diluted with water, are used to feed the hydrocyclones in stage 12. Water is added via pipe 13 in order to adjust the concentration of the feed to the hydrocyclones in stage 12. The hydrocyclones in stage 12 are fed from a buffer tank 13a by means of pump 13b. Hydrocyclones of a type with a d50 value of 8-12 μm, and a d95 value of 25-50 μm should preferably be used.

The bottom flows 16 from the hydrocyclones in stage 12 may be combined with the flow from pipe 3 and filtered by means of a press filter or vacuum filter, then fed to a sintering plant 31, to be agglomerated and used as feed for blast furnaces.

In each hydrocyclone the sludge flow supplied is separated into a top flow consisting of a substantially diluted suspension of the finest particles in the supply and a bottom flow containing the coarser particles in the supply, thickened to a greater or lesser degree. As is apparent from the grain analysis already given, separation may also be brought about by this method to obtain a fraction that is richer in zinc and lead (the top flow) and one that is poorer in zinc and lead (the bottom flow). The top flow from the cyclones in stages 11 and 12 may be disposed as desired according to the local conditions and regulations. It can be used as a filler in asphalt, concrete, brick, etc., or it can be subsequently processed further.

The aim is to obtain a zinc and lead content which is as low as possible in discharge pipe 16 for the bottom flow of the hydrocyclones in stage 12, and a quantity of dust which is as small as possible in the top flow pipes 14 and 15.

The blast furnace gas dust which is released in the scrubbing process in a modern blast furnace plant will frequently have a composition which is comparable with that already described. The above-mentioned process conditions described above have proved most suitable for separating this material, as is shown by the following examples:

EXAMPLE 1

A blast furnace gas dust obtained from preseparation and thickening after wet gas scrubbing was processed with the following composition.

| Zn: | 0.3% | | |
|---|---|---|---|
| Pb: | 0.4% | | |
| Fe: | 29% | | |
| Grain analysis: | <5 μm | 11% | by weight |
| | 5-10 | 3 | |
| | 10-20 | 14 | |
| | 20-30 | 7 | |
| | 30-60 | 27 | |
| | >60 | 38 | |

Only the hydrocyclones in stage 11 were used for this example.

Operating conditions of the hydrocyclones:
Dust concentration in feed: 27% by weight
Initial pressure: 2 bars ($2 \times 10^5$ Nm$^{-2}$)

The amount of solid dust in the bottom and top flows was analysed and was found to be as follows:

| | % Zn | % Pb | % Fe |
|---|---|---|---|
| top flow | 1.18 | 1.87 | 27 |
| bottom flow | 0.10 | 0.12 | 33 |

The separation output was also measured, this being defined as follows:

$$\text{separation output } (\eta) = \frac{\text{quantity of material in the top flow}}{\text{quantity of material in the feed}} \times 100\%$$

| | Total dust | Zn | Pb | Fe |
|---|---|---|---|---|
| Separation output | 14% | 66% | 72% | 12% |

EXAMPLE II

A blast furnace gas dust was processed with the following composition:

| Zn: | 0.46% |
|---|---|
| Pb: | 0.09% |

| | | | |
|---|---|---|---|
| Fe: | 38% | | |
| C: | 30% | | |
| Grain analysis: | <5 μm | 14% | by weight |
| | 5–10 | 3 | |
| | 10–20 | 12 | |
| | 20–30 | 3 | |
| | 30–60 | 29 | |
| | >60 | 39 | |

In this test, only the hydrocyclones in stage 11 were used.

Operating conditions of the hydrocyclones:
Dust concentration, feed: 28% by weight
Initial pressure: 2 bars ($2 \times 10^5$ Nm$^{-2}$)

The amount of dust in the bottom and top flows was analysed and found to be as follows:

| | % Zn | % Pb | % Fe |
|---|---|---|---|
| top flow | 1.16 | 0.29 | 25 |
| bottom flow | 0.28 | 0.03 | 44 |

| The separation output was found to be | | | |
|---|---|---|---|
| | Total dust | Zn | Pb | Fe |
| Separation output | 20% | 52% | 63% | 13% |

EXAMPLE III

Further improvement in the separation ouptut may be achieved by subjecting the bottom flow in stage 11 to further hydrocycloning treatment in stage 12. The bottom flow from stage 11 is diluted for this purpose to 10–25% by weight of dust by adding the required quantity of water, and is then fed to hydrocyclones in stage 12 at a pressure of 1 to 2 bars, (1 to $2 \times 10^5$ Nm$^{-2}$), the hydrocyclones being of the same type as those in stage 11.

Composition of blast furnace gas dust after scrubbing, separation and thickening:

| | | | |
|---|---|---|---|
| Zn: | 0.91% | | |
| Pb: | 0.15% | | |
| Grain analysis: | <5 μm | 23% | by weight |
| | 5–10 | 4 | |
| | 10–20 | 17 | |
| | 20–30 | 8 | |
| | 30–60 | 28 | |
| | >60 | 20 | |

Operating conditions of the hydrocyclones:

stage 11 solid dust concentration feed: 10% by weight
initial pressure: 2 bars ($2 \times 10^5$ Nm$^{-2}$)

stage 12:

solid dust concentration feed: 11% by weight
initial pressure: 2 bars ($2 \times 10^5$ Nm$^{-2}$)

Analyses of dust in bottom and top flow, after stage 11:

| | % Zn | % Pb |
|---|---|---|
| top flow | 1.96 | 0.37 |
| bottom flow | 0.45 | 0.05 |

| separation output ($\eta$) after stage 11: | | |
|---|---|---|
| | Total dust | Zn | Pb |
| separation output | 28% | 63% | 74% |

Analyses of dust in bottom flow after stage 12, and in the combined top flows from stages 11 and 12:

| | % Zn | % Pb |
|---|---|---|
| top flow | 1.87 | 0.35 |
| bottom flow | 0.32 | 0.02 |

| Separation output ($\eta$) after stage 12: | | |
|---|---|---|
| | Total dust | Zn | Pb |
| separation output ($\eta$) | 37% | 79% | 92% |

A comparison of the results after stage 11 and stage 12 clearly shows that the zinc content in the top flow has been reduced by approximately 30%. The quantity of separated zinc and lead has increased by approximately 40% and 25% respectively.

Figure 2:
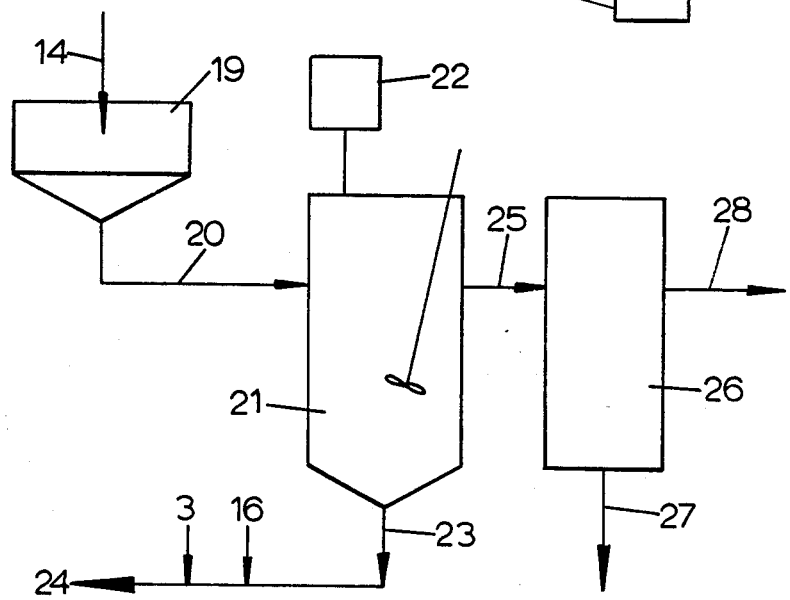
FIG. 2 is a diagram showing the further processing of the coarse grain.

After the hydrocyclone separation, two products may be distinguished: the bottom flow, which can be reused in the blast furnace process, by means of filtering and agglomeration, and the top flow, for which a number of discharge possibilities have already been described. One of these possibilities is to a further processing stage. This route is shown diagrammatically, connected to the hydrocycloning, in FIG. 1 and also in FIG. 2.

The top flow fraction, after thickening in a thickener 19, is fed through pipe 20 to tank 21, in which the top flow is leached by hydrochloric acid. This hydrochloric acid is supplied from tank 21. The overflow 18 from thickener 19 is returned to the wet scrubbing process. After the zinc and lead compounds have been sufficiently dissolved, the residue is discharged from underneath tank 21, through pipe 23. The product which flows from pipes 16 and 23 is collected in pipe 24, then after filtration fed to a sintering belt, for manufacturing sintered material, which can in turn be supplied to a blast furnace. The solution from tank 21 is then fed through pipe 25 to a reactor 26, in which zinc and lead can be separated and discharged through pipe 27, either by means of solvent extraction or by means of ion exchange, or even by gradually increasing the degree of acidity, by metering in lime water or soda lye, or by passing through $H_2S$ or adding $(NH_4)_2S$.

The solution thus largely depleted of zinc and lead can then be siphoned through pipe 28 into the sewer, where it contains hardly any materials which are harmful to surface water.

These chemical and physicochemical processes used for separating zinc and lead from the fraction deriving from thickener 19 are sufficiently well known to the skilled man, and need no further explanation.

A further improvement in the separation of dust into a component with high Zn and Pb content and a component with low Zn and Pb content can be achieved if the method as described with reference to FIG. 1 and in example III is modified so that the top flow from the second stage of hydrocyclones 12 is not led through conduit 15 to be combined with the top flow from the first stage of hydrocyclones 11, but instead is fed back into the feed line 9 to the first stage of hydrocyclones 11.

It has been found by tests that if this modification is made, the separation efficiency η for Zn and Pb remains substantially unchanged, as compared with the example III. However, the total quantity of fine dust leaving the first stage of hydrocyclones 11 as a top flow is now further reduced, which means that the % Zn and Pb in the dust contained in the top flow from the first stage of hydrocyclones 11 is substantially higher than in example III. The subsequent leaching of Pb and Zn from the flow becomes more efficient and hence more economical.

The feed-back line for the top flow from the second stage of hydrocyclones 12, to be fed into the first stage of hydrocyclones 11, replacing conduit 15, has not been illustrated. The construction of such a modification will be immediately clear to the skilled man.

What is claimed is:

1. A method of treating blast furnace gas containing dust particles of a range of sizes comprising the steps of:
   dry removal of the coarsest dust particles from said blast furnace gas;
   wet scrubbing said blast furnace gas to collect dust in said blast furnace gas;
   separating said collected blast furnace gas dust in a first separation stage into a coarse grain fraction and a fine grain fraction;
   concentrating said fine grain fraction from said first separation stage;
   separating said concentrated fine grain fraction in a second separation stage into a coarse grain fraction and a fine grain fraction;
   and feeding the coarsest dust particle from said first separation stage and said second separation stage to an agglomeration plant for preparing feed material suitable for feeding into a blast furnace.

2. A method according to claim 1 including further separation of said fine grain fraction from said second separation stage in one or more subsequent separation stages, each of said subsequent separation stages separating the fine grain fraction of the preceding separation stage into a fine grain fraction and a coarse grain fraction.

3. A method of treating blast furnace gas containing dust particles of a range of sizes comprising the steps of:
   dry removal of the coarsest dust particles from said blast furnace gas;
   wet scrubbing said blast furnace gas to collect dust in said blast furnace gas;
   separating said collected blast furnace gas dust in a first separation stage into a coarse grain fraction and a fine grain fraction;
   concentrating said fine grain fraction from said first separation stage;
   separating said concentrated fine grain fraction in a second separation stage into a coarse grain fraction and a fine grain fraction; separating said fine grain fraction from said second separation stage in one or more subsequent separation stages, each of said subsequent separation stages separating the fine grain fraction of the preceding separation stage into a fine grain fraction and a coarse grain fraction;
   concentrating said fine grain fraction between each successive pair of separation stages;
   and feeding the coarsest dust particle from said first separation stage and said second separation stage to an agglomeration plant for preparing feed material suitable for feeding into a blast furnace.

4. A method according to claim 1 wherein said fine grain fraction and said coarse grain fraction from said first separation stage comprise dust particles of sizes respectively less and greater than 120 μm to 150 μm and wherein said concentration stage concentrates said fine grain fraction from said first separation stage to a concentration of said dust particles of between 10% and 50%.

5. A method according to claim 4 wherein said concentration stage concentrates said fine grain fraction to a concentration of between 10% and 30%, and wherein said second separation stage is carried out at an initial pressure of between 0.5 and 3 kg/cm$^3$ ($5\times10^4$ and $3\times10^5$ Nm$^{-2}$).

6. A method according to claim 1 wherein said fine grain fraction and said coarse grain fraction from said second separation stage comprise dust particles respectively less and greater than 5 μm to 25 μm and wherein said coarse grain fractions from said first and second separation stages are filtered and dried and said dried material is fed to a sintering process.

7. A method according to claim 1 wherein said first separation stage is carried out in an overloaded thickener.

8. A method according to claim 1 wherein said first separation stage is carried out in a hydrocyclone installation.

9. A method according to claim 1 wherein said second separation stage is carried out in a hydrocyclone installation, said hydrocyclone installation including a plurality of hydrocyclones connected in series, each hydrocyclone producing a top flow and a bottom flow, the top flow from each hydrocyclone being connected in common, the bottom flow of each hydrocyclone being fed to the succeeding hydrocyclone in said series connection of hydrocyclones.

10. A method according to claim 1 wherein said second separation stage is carried out in a hydrocyclone installation, said hydrocyclone installation including a plurality of hydrocyclones connected in series, each hydrocyclone producing a top flow and a bottom flow, the top flow from each hydrocyclone is fed back to the preceding hydrocyclone in said series connection of hydrocyclones, the bottom flow from each hydrocyclone being fed to the succeeding hydrocyclone in said series connection of hydrocyclones.

11. A method according to claim 1 wherein said concentration step is carried out in a settling basin water from said settling basin being returned to said wet scrubbing step.

12. An apparatus for treating blast furnace gas containing dust particles of a range of sizes comprising:
   a first separating device adapted to separate blast furnace gas dust into a fine grain fraction and a coarse grain fraction;
   a first concentration stage adapted to receive said fine grain fraction from said first separating device and increase the concentration of dust in said fine grain fraction,
   a second separating device adapted to receive concentrated fine grain fractions from said first concentration stage and to separate said concentrated fine grain fraction into a coarse grain fraction and a fine grain fraction;
   and means to feed the coarse grain fractions from the first and second separating devices to an agglomeration plant for preparing feed suitable for feeding into a blast furnace.

13. An apparatus according to claim 12 further including a second concentration stage adapted to receive said fine grain fraction from said second separating device and increase the concentration of dust in that fine grain fraction.

* * * * *